United States Patent Office 3,669,585
Patented June 13, 1972

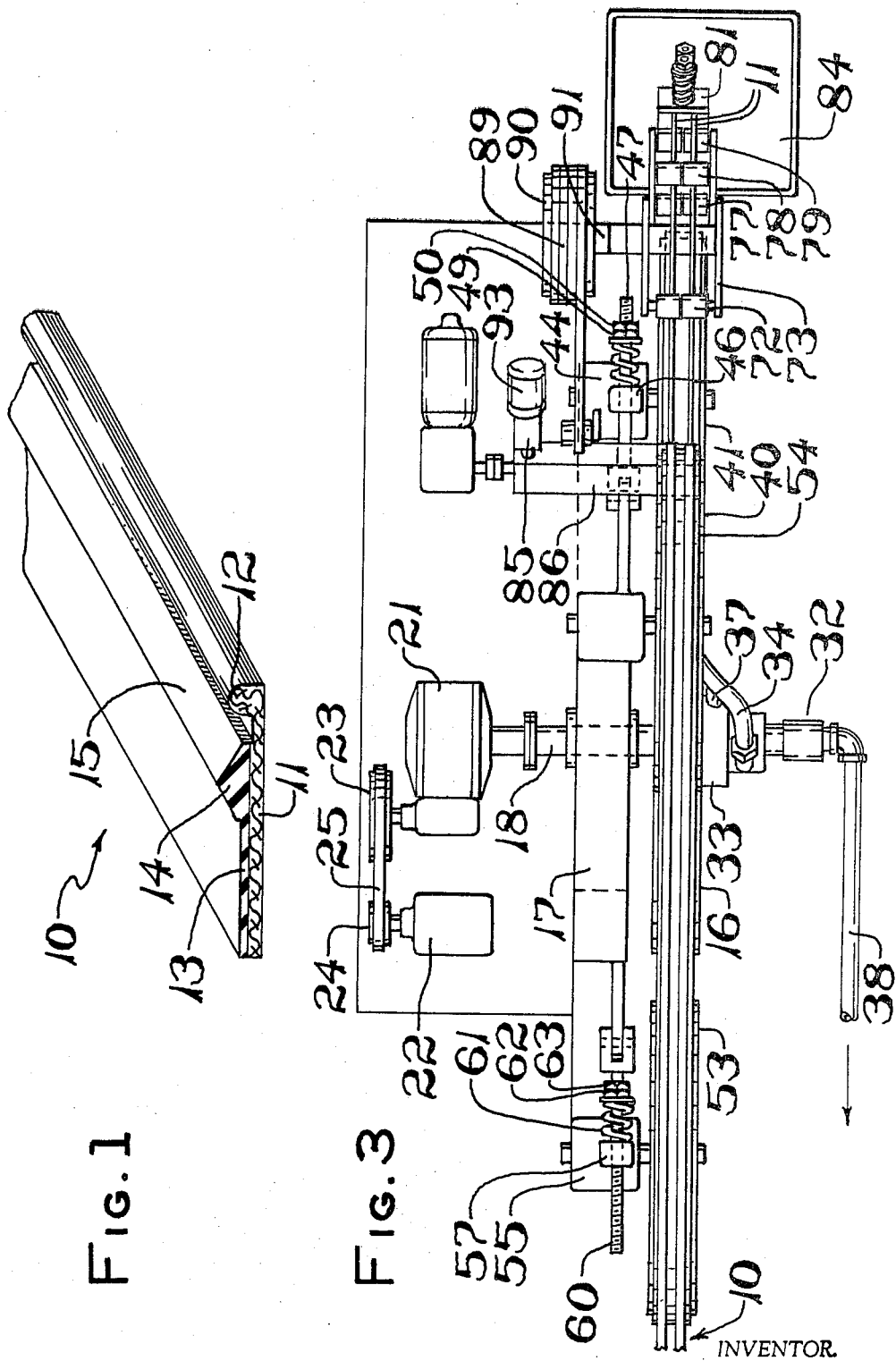

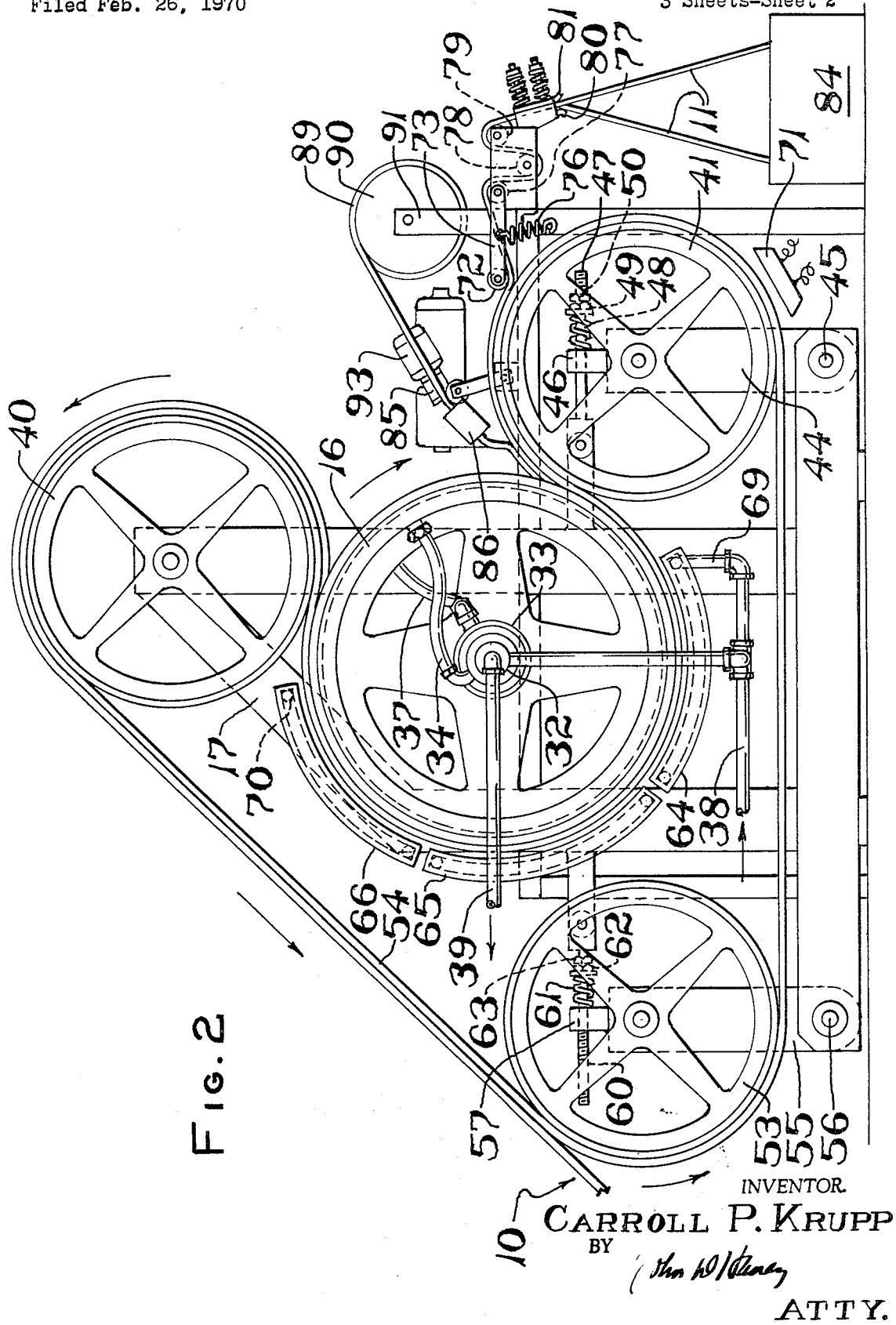

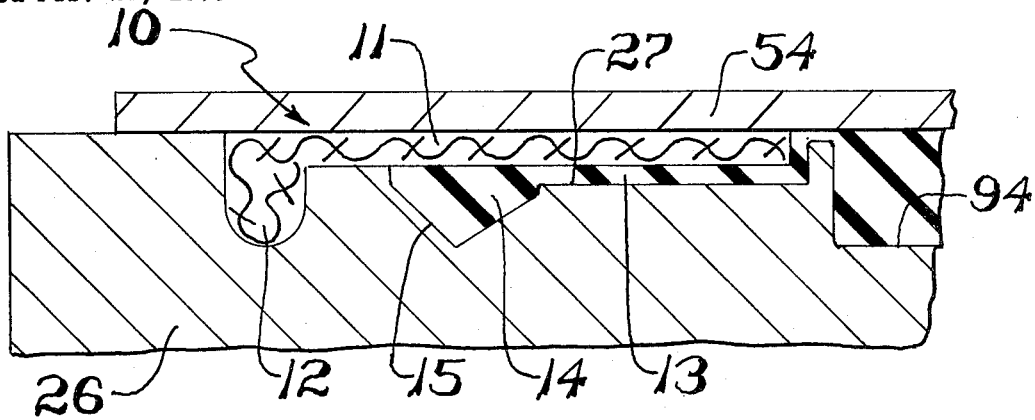
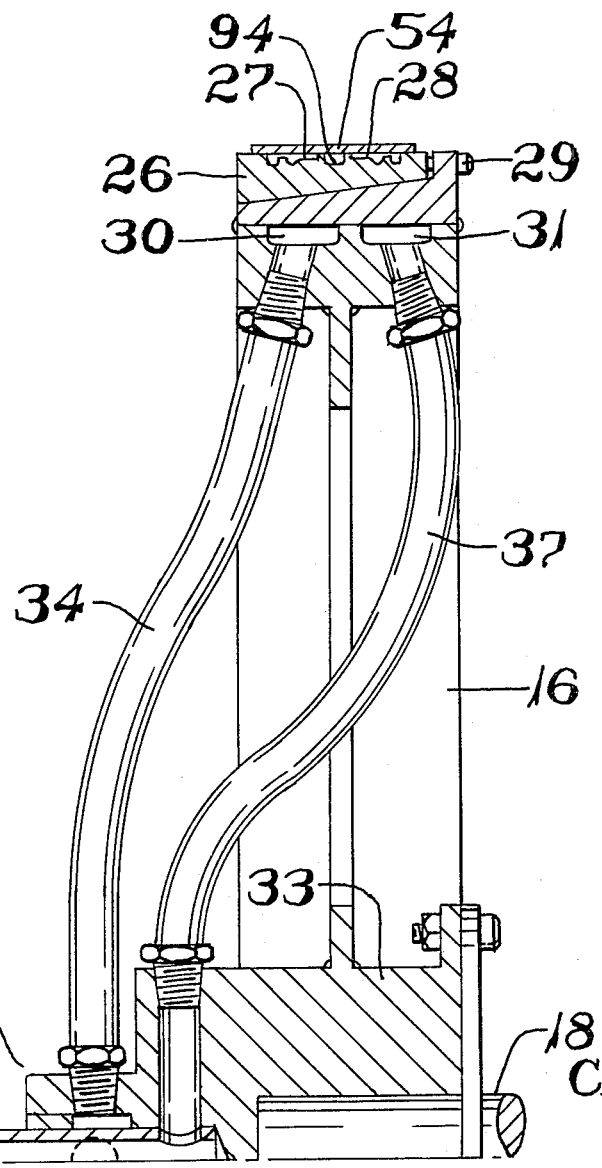

3,669,585
CONTINUOUS STRIP MOLDING APPARATUS
Carroll P. Krupp, Akron, Ohio, assignor to The B. F. Goodrich Company, New York, N.Y.
Filed Feb. 26, 1970, Ser. No. 14,553
Int. Cl. B29f 3/00
U.S. Cl. 425—109       3 Claims

ABSTRACT OF THE DISCLOSURE

The continuous molding of an elastomeric sealing strip on a tape for a slide fastener in which a preformed strip of elastomeric material is applied to a tape as it is continuously fed into a mold cavity on the periphery of a rotating heated curing drum. The tape and preformed strip are enclosed in the mold cavity by a metal belt wrapped around a portion of the curing drum and driven at the same speed as the drum. The molded elastomeric sealing strip and tape are enclosed in the mold cavity at a molding temperature for a period of time necessary to cure the sealing strip on the tape after which the tape is released and carried away from the curing drum.

BACKGROUND OF THE INVENTION

This invention relates to a method of manufacturing a slide fastener stringer in which a strip of elastomeric material is molded on a fabric tape and to the apparatus for applying the elastomeric strip and molding it to the tape. This method and apparatus is especially adapted to molding the sealing lips of a fluid sealing slide fastener of the type disclosed in my co-pending patent application Ser. No. 873,760 for "Sealing Closure." Heretofore the sealing lips on a fluid sealing slide fastener have been produced by hand and one at a time. This hand operation limits production of this type of slide fastener whereas there is a need for quantity production to meet the demand. It is, therefore, desirable to mold the sealing strip on the fabric tape as it travels at a relatively high speed such as ten to thirty feet per minute and to do this an apparatus is needed which will continuously cure the elastomeric material. Rubber compounds are available which can be cured in a matter of seconds at relatively high temperatures; however, a process is needed in which the stock can be brought up to a near-cure temperature before molding to reduce the molding time and in which the feeding of the stock into the mold cavity can be controlled to prevent premature curing of the rubber compound. These requirements call for a process which can be automated to provide the necessary control.

SUMMARY OF THE INVENTION

According to this invention, the tape is fed under tension and over a heated surface into a mold cavity in the periphery of a rotatable curing drum. The elastomeric material is plasticized and heated after which it is preformed and applied to the tape at the proper postion prior to entering the mold cavity. The tape and preformed strip of elastomeric material are continuously enclosed in the mold cavity by a metal belt which extends part way around the curing drum. After the tape and the elastomeric material have travelled with the curing drum in the mold cavity and under the metal belt at the required molding temperature, the molded strip and tape are released and carried away from the curing drum.

This process is facilitated by the apparatus of the invention in which a roller over which the tape is fed applies a braking force and creates tension in the tape. It is also stretched over a heated metal belt which preheats and smooths out the surface of the tape. The elastomeric material may be processed in a screw-type extruder with a cross-head die and appropriate controls for producing a preformed strip which is the same shape as the mold cavity. An idler pulley supporting the metal belt is also adjustable and spring-loaded to apply pressure against the metal belt where it covers the mold cavity and the tape and preformed sealing strip are enclosed in the mold cavity. Heaters in the curing drum and around the metal belt provide the proper curing tempertaure. At the end of the curing time, the metal belt is moved away from the curing drum over another idler pulley and the molded tape is released from the curing drum.

The accompanying drawings show one preferred method of practicing this invention with an apparatus embodying the invention.

BRIEF DESCRIPTION OF THE DRAWINGS

In the drawings:

FIG. 1 is a fragmentary perspective view of a slide fastener stringer manufactured by the process and with the apparatus of the invention.

FIG. 2 is an elevation of apparatus for manufacturing a slide fastener stringer by the process of the invention.

FIG. 3 is a plan view of the apparatus shown in FIG. 2.

FIG. 4 is an enlarged section of the curing drum taken along the line 4—4 of FIG. 2.

FIG. 5 is an enlarged sectional view of the mold cavity shown in FIG. 4, parts being broken away.

DETAILED DESCRIPTION

Referring to FIG. 1 a stringer 10 manufactured by the method of this invention and with the apparatus of this invention is shown. An elongated body or tape 11 of flexible material which may be of woven fabric of cotton, nylon or other textile material has an integral bead 12 or cord attached to one edge. A sealing strip 13 of elastomeric material such as rubber or other rubber-like material is molded on one face of the tape 11 and has a projecting sealing lip 14 with a sealing face 15 which engages the sealing face of a sealing lip on an opposing margin of a slide fastener and therefore must be smooth and accurately formed. It is also important that no flashing from the molding operation be located at the lip 14 or on the sealing face 15. Slide fastener teeth (not shown) are clamped on the bead 12 after the stringer is molded and before the slide fastener is assembled. A slide fastener of this type is shown and described in my co-pending application Ser. No. 873,760 on "Sealing Closure."

Apparatus for carrying out the process of this invention is shown in FIGS. 2, 3, 4 and 5. A rotatable curing drum 16 is mounted on a frame 17 and is driven by a shaft 18 connected to a speed reducer 21 which in turn is driven by a motor 22 connected to the speed reducer by pulleys 23 and 24 and a V-belt 25.

As shown in FIG. 4, an accurately machined metal ring 26 with two mold cavities 27 and 28 is attached to the cavity drum 16 as by studs 29.

The curing drum 16 is fabricated with channels 30 and 31 in the outer rim through which heating fluid such as oil may be circulated. These channels 30 and 31 are connected to a rotary joint 32 mounted on the hub 33 of the curing drum by flexible conduits 34 and 37. The rotary joint 32 is connected to the oil heating and temperature control apparatus (not shown) by supply pipe 38 and discharge pipe 39.

An idler roll 40 is mounted on the frame 17 on an axis parallel with the axis of curing drum 16 and with its outer periphery in close proximity to the outer periphery of the metal ring 26 on the curing drum. A second idler roll 41 is located at a spaced-apart position along the periphery of the curing drum 16 from said first idler roll 40. This second idler roll is mounted about an axis parallel to the axis of the curing drum 16 on an arm 44 which is pivotally mounted to the frame 17 by a pin 45 for swinging movement of the second idler roll toward and away from the curing drum 16. The arm 44 has a sleeve 46 disposed around a threaded rod 47 which is connected to the frame 17. At the distal end of the threaded rod 47, a coil spring 48 is disposed around the rod and held by nuts 49 and 50 threaded on the rod.

A third idler roll 53 is also located about an axis parallel with the axis of curing drum 16 and in a position so that an endless belt 54 passing around the three idler rolls will not engage the curing drum 16. The belt 54 may be of metal such as stainless steel or other flexible heat conducting material having a high tensile strength. This belt 54 extends from the first idler roll 40 to the third idler roll 53 and then around the second idler roll 41 and between the roll and metal ring 26 of the curing drum 16 where it is in engagement with the metal ring and is driven at the same speed as the metal ring. It then extends from the metal ring 26 to and around the first-mentioned idler roll 40. In order to place the belt 54 under tension, the third idler roll 53 is also mounted on an arm 55 which is pivotally connected to frame 17 by a pin 56 which permits swinging of the roll toward or away from the curing drum 16. A sleeve 57 on the arm 55 is disposed around a threaded rod 60 which is connected to the frame 17. A coil spring 61 is disposed around the threaded rod 60 between the sleeve 57 and rod connection to the frame 17 and is adjustably compressed against the sleeve 57 by adjusting nuts 62 and 63.

Segmental fluid heaters 64, 65 and 66 are located radially outward and in close proximity to the belt 54 in the areas where the belt engages the metal ring 26. These heaters are connected by pipes 69 and 70 to the temperature control apparatus (not shown). An auxiliary heater 71 for heating the belt 54 may be located adjacent the second idler roll 41 and mounted on the frame 17. Between the auxiliary heater 71 and the nip where the belt 54 engages the metal ring 26, a hold-down roller 72 is mounted on an arm 73 which is pivoted to hold the roller against the belt 54 by a coil spring 76. This hold-down roller 72 receives the elongated body or tape 11 from rollers 77, 78 and 79 over which the tape passes after it is flattened between plates 80 and 81 through which the tape passes as it is drawn from an open shipping container such as box 84.

As shown in FIGS. 2 and 3, two of the tapes 11 are withdrawn from the box 84 and processed simultaneously by this apparatus. Accordingly, the rollers 72, 77, 78 and 79 are dual rollers for handling two tapes.

In order to provide a smooth surface on each tape 11 on which the strip 13 of elastomeric material may be applied, roller 78 is provided with braking means which may be a permanent magnet-type hysteresis brake to provide a constant and uniform tension force on the tape.

In accordance with the requirements of the process of this invention, each preformed strip 13 of elastomeric material is applied to each tape 11 in the area between the hold-down roller 72 and the nip where the belt 54 engages the metal ring 26 of the curing drum 16. Each preformed strip 13 may be provided by an extruder 85 of the screw type having a double die crosshead 86 with a die located directly over each tape 11 for extruding a strip of desired cross section to exactly fill a mold cavity 27 in the metal ring 26 of the curing drum 16. An extruded elastomeric cord 89 circular in cross section is contained on a supply reel 90 held by bracket 91. This cord 89 is fed into the extruder 85 by a variable speed stock feed mechanism 93 attached to the extruder. The speed of the stock feed mechanism 93 and the extrusion rate are synchronized with the rotation of the curing drum 16 so that a constant cross section and volume of preformed elastomeric strip material 13 is fed to each mold cavity 27. It is understood that if desired, suitable electrical controls may be installed to monitor the size of the bead of extruded stock in the nip of the curing drum 16 and the second idler roll 41. It will also be understood that the crosshead 86 may be laterally adjustable so that the position of each side may be adjusted for proper placement of each extruded strip 13 on each tape 11.

It is also obvious that the curing drum 16 can be made wider to contain more than two mold cavities 27 and 28 and thus increase production per unit.

In operation of this apparatus which necessarily follows the method of the invention, each elongated body of flexible material such as tape 11 is pulled out of shipping box 84 through plates 80 and 81 and over rollers 79, 78 and 77 and then under hold-down roller 72 and along the belt 54 into the nip between the second idler roll 41 and the metal ring 26 of curing drum 16. The brake of roller 78 provides a uniform drag on the tape 11 and maintains it in tension while the heat in belt 54 acts as an iron on the textile fabric to provide a smooth uniform surface. The heat in the belt 54 is residual from the curing drum and may be supplemented by the auxiliary heater 71. This preheating of the tape 11 is also important in bringing the tape and sealing strip 13 up to curing temperature quickly after it enters the mold cavity.

Applying of a preformed sealing strip 13 of elastomeric material on the tape 11 is accomplished in this embodiment by feeding the cord 89 of elastomeric material into an extruder 85 where it is plasticized and heated and then extruded from a die in double die crosshead 86 in a preformed uniformly preheated condition at the desired position on the tape 11 prior to entering the mold cavity 27.

Continuously enclosing the tape 11 and preformed strip 13 of elastomeric material in the mold cavity 27 takes place at the nip between the second idler roller 41 and the curing drum metal ring 26 with the belt 54 acting as one mold surface and the cavity 27 as the other mold surface. The tape 11 is carried by the belt 54 which is driven at the peripheral speed of the curing drum 16 and therefore the tape 11 and sealing strip 13 are fed into the mold cavity 27 at the same speed the metal ring 26 is moving. The necessary pressure of the belt 54 against the metal ring 26 is provided by the compression of spring 48 against sleeve 46 of the arm 44 supporting second idler roll 41 which urges the second idler roll against the metal ring 26. Also tension in the belt 54 is maintained by coil spring 61 pressing against sleeve 57 of the arm 55 supporting the third idler roll 53. This pressure of the belt 54 against the metal ring 26 of the curing drum 16 provides a tight seal and, as shown in FIG. 5, the strip 13 of elastomeric material is molded to the tape 11 with a smooth sealing surface 15 on the lip 14. At the edge of the mold cavity 27 opposite to that which contains the bead 12, an overflow cavity 94 is provided into which an overflow bead portion of elastomeric material may flow. The connection between this material in the overflow cavity 94 and the tape 11 has a thin cross section or tear section providing for an easy tear off of this overflow material after the stringer 10 has been molded.

The tape 11 and sealing strip 13 are enclosed in the mold cavity for a period of time and at a temperature necessary to cure the elastomeric material.

In one application of this invention where the elastomeric material is a rubber compound, the tape 11 is moved through this apparatus by the curing drum 16 which is driven by speed reducer 21 and motor 22 at a speed of from ten to thirty feet per minute. The temperature in the mold cavity 27 is maintained at a range of from 375° F. to 400° F. by the flow of hot oil in segmental heaters 64, 65 and 66 radially outward of the belt 54 and in the channels 30 and 31 fabricated in the rim of the curing drum 16. A temperature retarder may be added to the rubber compound to prevent setup of the stock of elastomeric material during plasticizing and heating.

After the molded stringer 10 is released from the mold cavity 27 it is carried away on the belt 54 which passes around idler roll 40 and the third idler roll 53 where the partially cooled stringer 10 may be directed to a continuous inspection apparatus and into a container where it is ready for application of the slide fastener teeth.

I, therefore particularly point out and distinctly claim as my invention:

1. A continuous strip molding apparatus for precision molding a strip of elastomeric material on an elongated tape or flexible material comprising a cylindrical rotatable curing drum, a mold cavity extending circumferentially of said drum providing a continuous groove in the face of said drum for receiving said tape and said strip of elastomeric material, means for simultaneously feeding said tape and said strip of elastomeric material into said mold cavity on said curing drum, means for applying a preformed strip of elastomeric material to said tape before it enters said mold cavity, a continuous belt engaging a portion of the face of said drum at the circumferential edges of said cavity and enclosing said strip and said tape in said mold cavity, means to heat said drum and said belt around said cavity to provide molding temperature in said cavity whereby said strip is shaped and adhered to said tape, means to rotate said curing drum so that it has a peripheral speed which is the same as the feeding speed of said tape into said mold cavity, means for driving said belt at the peripheral speed of said curing drum and means for directing said belt away from said curing drum to release the molded strip and tape from said mold cavity and carry it away from said curing drum.

2. A continuous strip molding apparatus for molding a strip of elastomeric material on an elongated body comprising means for feeding said elongated body into a mold cavity on a curing drum including a roller over which the body moves and braking means on said roller for applying tension to said body as it is pulled into said mold cavity, means for applying a preformed strip of elastomeric material to said elongated body before it enters said mold cavity, a continuous belt engaging a portion of said curing drum and said mold cavity for enclosing said strip and elongated body, means to rotate said curing drum so that it has a peripheral speed which is the same as the feeding speed of said elongated body into said mold cavity, means to heat said curing drum and said belt to provide a molding temperature for curing said strip of elastomeric material, means for driving said belt at said peripheral speed of said curing drum and means for directing said belt away from said curing drum to release the molded strip and elongated body from said mold cavity and carry it away from said curing drum 3. A continuous molding apparatus according to claim 2, wherein hold down means are provided between said roller and said mold cavity for urging said elongated body against said belt.

References Cited
UNITED STATES PATENTS

| | | | |
|---|---|---|---|
| 3,039,137 | 6/1962 | Smith et al. | 18—4 B |
| 2,760,228 | 8/1956 | Verges | 18—4 B UX |
| 3,178,768 | 4/1965 | Edberg | 18—4 B |

H. A. KILBY, JR., Primary Examiner

U.S. Cl. X.R.

18—13 R; 425—814, 113, 327